US011859406B2

(12) United States Patent
Kirk

(10) Patent No.: US 11,859,406 B2
(45) Date of Patent: Jan. 2, 2024

(54) NOISE REDUCTION STRIKE PLATE COVERING, METHOD OF DEPLOYING, AND SYSTEM

(71) Applicant: Alice Hixon Kirk, Canaan, CT (US)

(72) Inventor: Alice Hixon Kirk, Canaan, CT (US)

( * ) Notice: Subject to any disclaimer, the term of this patent is extended or adjusted under 35 U.S.C. 154(b) by 294 days.

(21) Appl. No.: 17/367,768

(22) Filed: Jul. 6, 2021

(65) Prior Publication Data

US 2022/0010592 A1 Jan. 13, 2022

Related U.S. Application Data

(60) Provisional application No. 63/048,907, filed on Jul. 7, 2020.

(51) Int. Cl.

*E05B 15/02* (2006.01)
*E05B 77/40* (2014.01)
*E05B 77/38* (2014.01)

(52) U.S. Cl.

CPC ........ *E05B 15/022* (2013.01); *E05B 15/0225* (2013.01); *E05B 15/0255* (2013.01); *E05B 77/38* (2013.01); *E05B 77/40* (2013.01)

(58) Field of Classification Search

CPC ............... E05B 15/022; E05B 15/0225; E05B 15/0255; E05B 77/38; E05B 77/40
See application file for complete search history.

(56) References Cited

U.S. PATENT DOCUMENTS 1,318,988 A * 10/1919 Good .................... E05B 15/022 292/341.13
1,624,568 A * 4/1927 Westrope ............ E05B 15/0245 292/341.18
1,655,556 A * 1/1928 Marshall ............. E05B 15/0245 292/341.18
1,670,510 A * 5/1928 Kiehler ............... E05B 15/0245 292/341.18
RE17,083 E * 9/1928 Lundberg .............. E05B 15/024 292/341.18
2,010,395 A * 8/1935 Johnson ................ E05B 15/022 292/346
2,535,444 A * 12/1950 Miller ................. E05B 15/0255 292/341.13
2,645,516 A * 7/1953 Robertson ........... E05B 15/0205 292/341.12
2,676,048 A * 4/1954 Zenick ................ E05B 15/0255 292/341.12
2,695,808 A * 11/1954 Manchester ........ E05B 15/0245 292/341.18
2,863,692 A * 12/1958 Mann .................... E05B 15/024 292/341.18
2,869,913 A * 1/1959 Schlage .............. E05B 17/0045 292/341.12
2,993,719 A * 7/1961 Manchester ........ E05B 15/0255 292/341.18

(Continued)

*Primary Examiner* — Christine M Mills
*Assistant Examiner* — Faria F Ahmad
(74) *Attorney, Agent, or Firm* — Hoffman Warnick LLC

(57) ABSTRACT

A noise reduction strike plate covering including a sheet of noise dampening material adaptively shaped to cover a strike plate in a door frame with a portion of the sheet including a bolt hole insert adaptively shaped to insert a bolt hole through the strike plate and a portion of the sheet including a strike ramp grip adaptively shaped to grip an end of a strike bolt ramp of the strike plate.

15 Claims, 11 Drawing Sheets

(56) References Cited

U.S. PATENT DOCUMENTS

| | | | | | |
|---|---|---|---|---|---|
| 3,007,732 | A * | 11/1961 | Schlage | E05B 15/0255 | 292/341.12 |
| 3,161,429 | A * | 12/1964 | Tornoe | E05B 15/025 | 292/341.18 |
| 3,287,055 | A * | 11/1966 | Schlage | E05B 15/0255 | 292/341.12 |
| 3,361,466 | A * | 1/1968 | Russell | E05B 15/0245 | 292/341.18 |
| 3,506,293 | A * | 4/1970 | Armstrong | E05B 15/0245 | 292/341.19 |
| 4,813,724 | A * | 3/1989 | Dietrich | E05B 15/022 | 292/341.12 |
| 4,892,341 | A * | 1/1990 | Dietrich | E05B 15/022 | 292/341.12 |
| 4,893,854 | A * | 1/1990 | Dietrich | E05B 15/022 | 292/341.12 |
| 5,890,755 | A * | 4/1999 | Speelman | E05B 83/30 | 296/37.8 |
| 6,089,627 | A * | 7/2000 | Pearson | E05B 15/0205 | 292/DIG. 60 |
| 2004/0219328 | A1* | 11/2004 | Tasaki | C22C 38/14 | 427/127 |
| 2006/0249960 | A1* | 11/2006 | Wilder | E05B 15/022 | 292/340 |
| 2010/0032967 | A1* | 2/2010 | Otsuka | B60N 2/01583 | 292/240 |
| 2011/0198872 | A1* | 8/2011 | Gentile | E05B 77/38 | 292/341.15 |
| 2017/0009486 | A1* | 1/2017 | Fenwick | E05B 15/022 | |
| 2017/0175417 | A1* | 6/2017 | Sweeten | E05B 15/024 | |
| 2020/0080355 | A1* | 3/2020 | Tung | E05C 1/006 | |

* cited by examiner 550
502
556
560

500

NOISE REDUCTION STRIKE PLATE COVERING, METHOD OF DEPLOYING, AND SYSTEM

CROSS REFERENCE TO RELATED APPLICATION

This patent application claims the benefit under 35 U.S.C. § 119(e) of U.S. Provisional Patent Application Ser. No. 63/048,907, filed Jul. 7, 2020, which is incorporated by reference as though fully set forth herein.

TECHNICAL FIELD

The subject matter of this invention relates to a noise reduction strike plate covering, method of deploying a noise reduction strike plate covering, and noise reduction strike plate covering system.

BACKGROUND

In numerous environments, noise reduction may be useful or desired. Noise may be disruptive, distracting, or harmful in a variety of settings—to individual people, groups of people, animals, laboratories, studios, and many other environments. Closing doors may create noise when the spring bolt of the door hardware hits the strike plate on the door jamb.

More specifically, a noisy hospital environment is not conducive to patient recovery or delivery of care by hospital personnel. The noise output generated by the routine activities of hospital life creates unhealthy soundscapes in which patients often struggle to relax, sleep, or have privacy.

Closing doors are a commonly cited source of noise in hospitals that disturb patients attempting to rest, and staff attempting to concentrate on work. Areas of hospitals where patients attempt to sleep are high traffic areas, with hospital staff entering and exiting rooms many times throughout the day and night.

Closing doors are not only disruptive in hospitals, but often disturb sleeping babies in nurseries and homes, students attempting to study in dorm rooms, as well as in a host of other similar scenarios in which people require or desire uninterrupted peace, quiet, and concentration.

SUMMARY

Aspects of the disclosure describe noise reduction strike plate covering, including a sheet of noise dampening material adaptively shaped to cover a strike plate in a door frame; wherein a portion of the sheet includes a bolt hole insert adaptively shaped to insert a bolt hole through the strike plate; and wherein a portion of the sheet includes a strike ramp grip adaptively shaped to grip an end of a strike bolt ramp of the strike plate.

A second aspect discloses a method of deploying a noise reduction strike plate covering, the method including securing the noise reduction strike plate covering over a strike plate without the use of adhesives or hardware; securing a bolt hole insert in a bolt hole of the strike plate; and securing a strike ramp grip over an end of a strike ramp of the strike plate.

A third aspect discloses a system including a strike plate; the noise reduction strike plate covering over the strike plate without the use of adhesives or hardware; securing a bolt hole insert in a bolt hole of the strike plate; and securing a strike ramp grip over an end of a strike ramp of the strike plate.

BRIEF DESCRIPTION OF THE DRAWINGS

These and other features of this invention will be more readily understood from the following detailed description of the various aspects of the invention taken in conjunction with the accompanying exhibits and images in which.

Any of the images are not necessarily to scale. The images are merely schematic representations and are not intended to portray specific parameters of the invention. The images are intended to depict only typical embodiments of the invention, and therefore should not be considered as limiting the scope of the invention.

DETAILED DESCRIPTION

Figure 1:
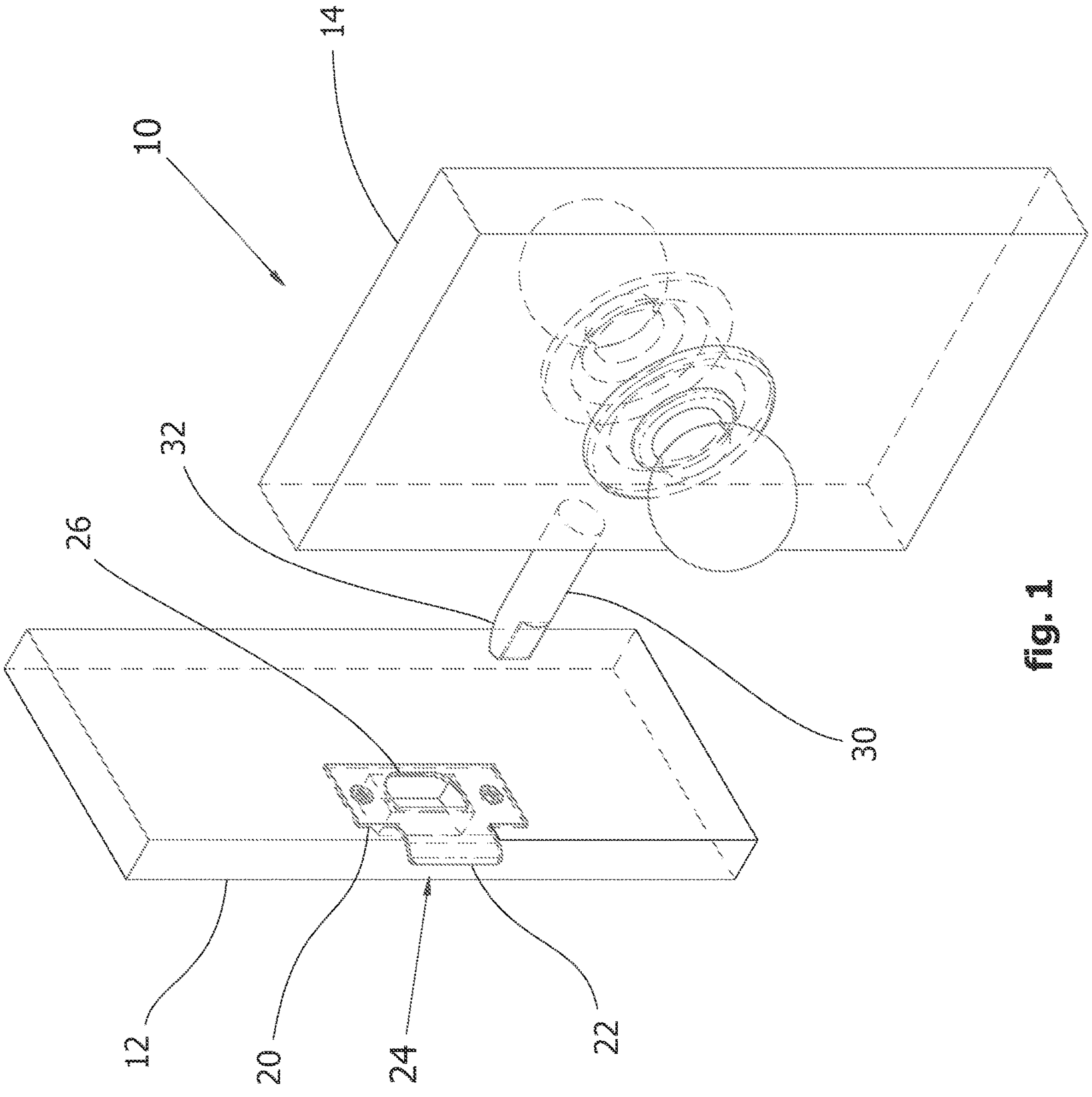
FIG. 1 shows a drawing of known strike plate and spring bolt.
Figures 2A, 2B, 2C, 2D, 2E, 2F, 2G:
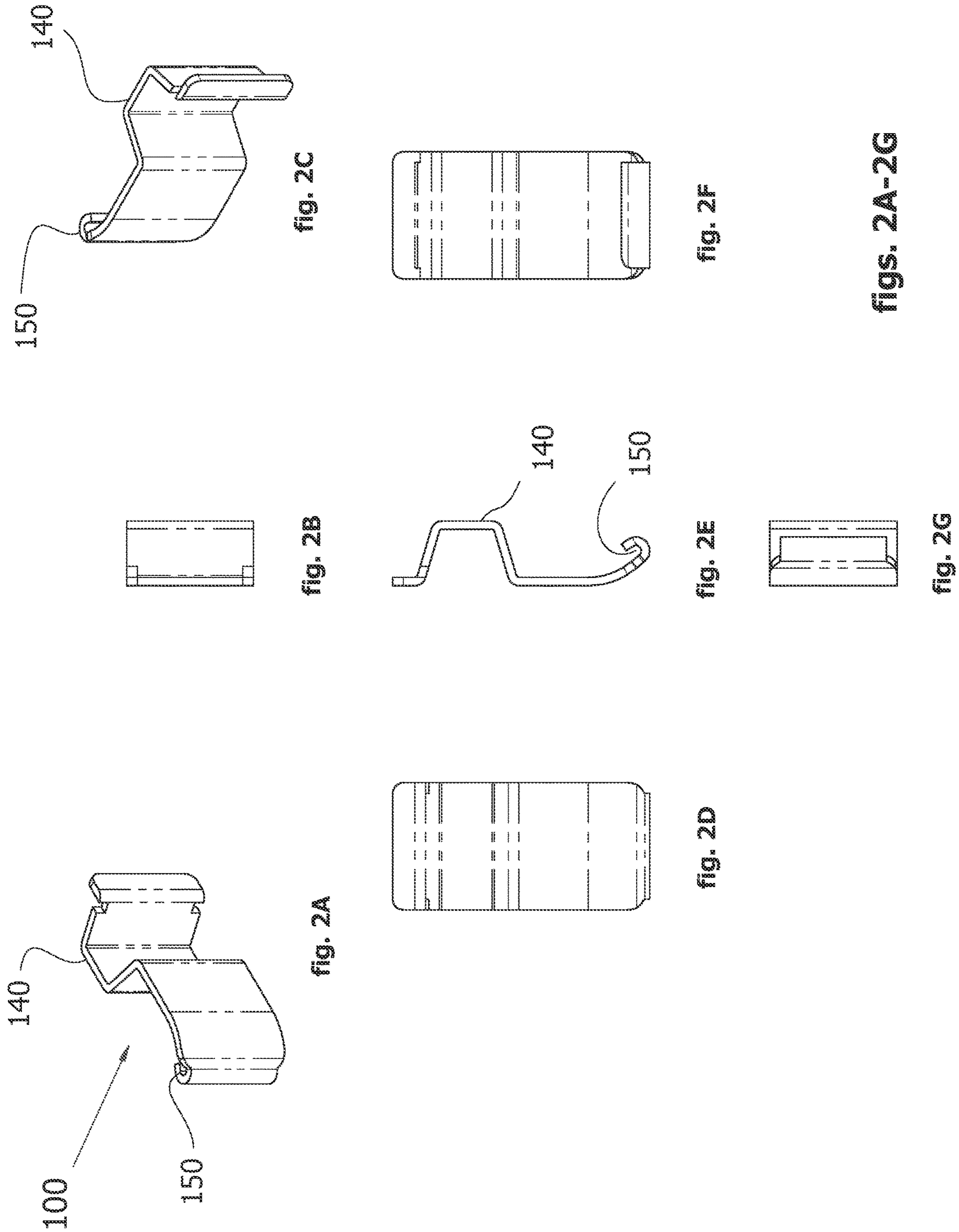
FIGS. 2A-2G show drawings of noise reduction strike plate covering according to embodiments.

Referring now to the exhibits, FIG. 1 shows a known door hardware assembly 10 including a known strike plate 20 and spring bolt 30. Strike plate 20 has a strike ramp 22 on an end 24 of strike plate 20. Strike plate 20 has a bolt hole 26 at center of strike plate 20. Strike plate 20 affixes to door jamb 12 with strike ramp 22 oriented to receive spring bolt 30. Spring bolt 30 has a bolt ramp 32 on a side of spring bolt 30. Spring bolt 30 is a portion of the door hardware assembly 10. As door 14 closes, bolt ramp 32 strikes strike ramp 22 pushing spring bolt 30 in and allowing spring bolt 30 to slide over strike plate 20. When door 14 is aligned with door jamb 12 the spring bolt 30 is aligned with bolt hole 26 on strike plate 20 and hole in door jamb 12. The spring bolt 30 releases into the bolt hole 26 and the door 14 is secured in a closed position. Known strike plates 20 and spring bolts 30 are reasonably uniform in terms of mechanism and dimensions.

FIGS. 2A-2G show perspective views of one embodiment of a strike plate covering 100. Strike plate covering 100 may include a sheet of noise dampening material adaptively shaped to cover a strike plate 20 on a door jamb 12 (FIG. 3).

A portion of the strike plate covering 100 may include a bolt hole insert 140. Bolt hole insert 140 may be adaptively shaped to insert into the bolt hole 26 of strike plate 20. Shape of bolt hole insert 140 is shown as a trapezoidal projection. Bolt hole insert 140 may be shaped to adapt to any shape of bolt hole 26. Noise dampening material may be sufficiently pliant to allow bolt hole insert 140 to adapt to various contours of bolt hole 26. A portion of the strike plate covering 100 may include a strike ramp grip 150. Strike ramp grip 150 is located at an end of the strike plate covering 100 distal to the bolt hole insert 140. Strike ramp grip 150 may be adaptively shaped to grip the strike ramp 22 of strike plate 20. Shape of strike ramp grip 150 is shown as a curve forming a hooked lip along an end of strike plate covering 100. Strike ramp grip 150 may grip an end of strike ramp 22. Noise dampening material may include a 3D-printed flexible resin. The noise dampening material may include a sheet magnet. Noise dampening material may include a rubber or silicone. Noise dampening material may include any material capable of absorbing sound. Noise dampening material may include any material with varying degrees of pliancy. Increased pliancy may allow strike plate covering to adapt to various differences in strike plate shapes and dimensions.

The strike plate covering 100 from a top view may be shaped as a rectangle. Length and width of rectangle may be adaptable to cover strike plate 20. The strike plate covering 100 from a side view may be substantially planar with a trapezoidal projection forming bolt hole insert 140. Depth of sheet may be adaptable to allow clearance for closing door 14. Strike plate covering 100 is not limited to specific dimensions.

Figure 3:
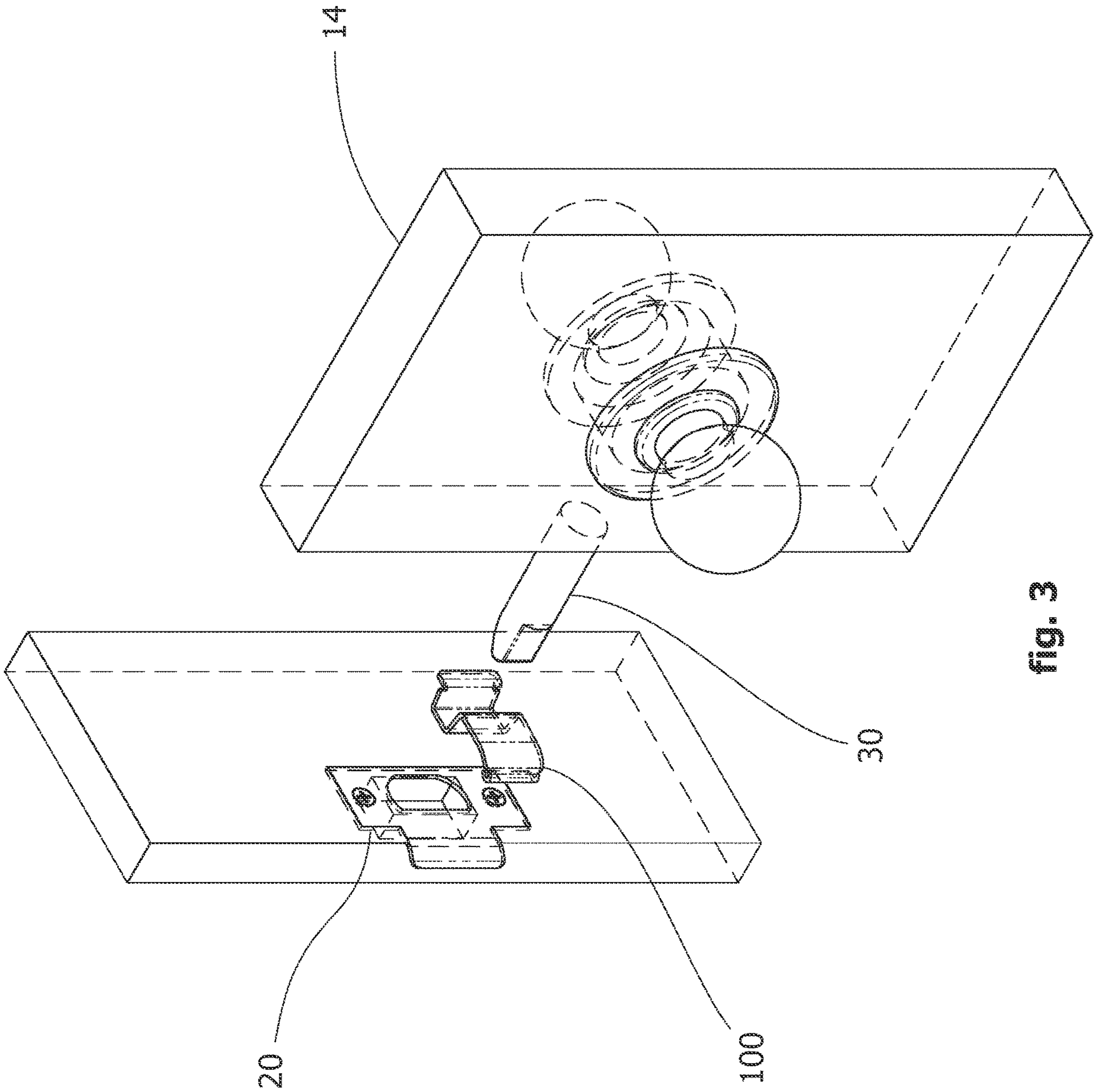
FIG. 3 shows a perspective drawing of noise reduction strike plate covering and strike plate and spring bolt according to embodiments.
Figure 4:
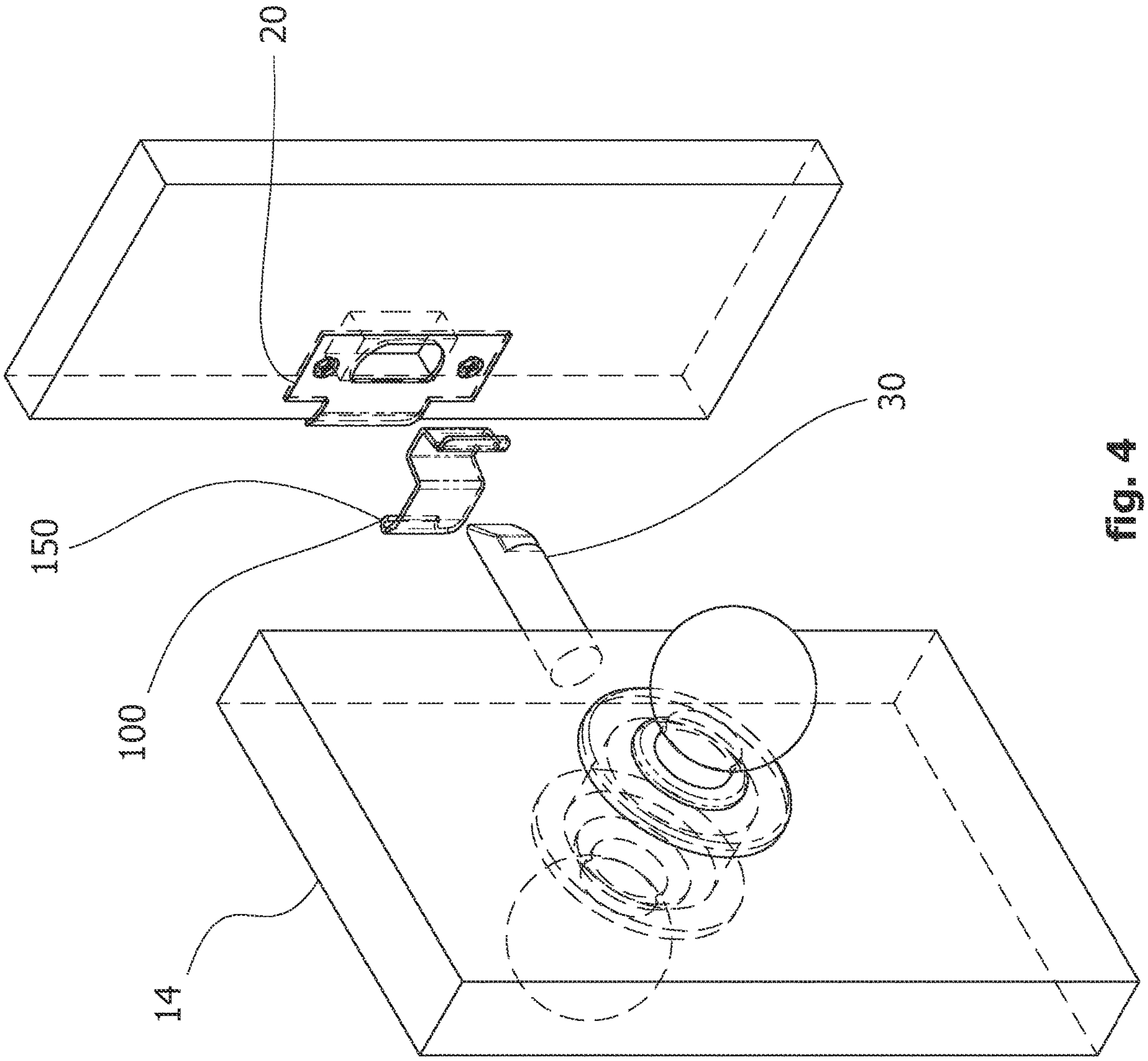
FIG. 4 shows a perspective drawing of noise reduction strike plate covering and strike plate and spring bolt according to embodiments.
Figure 5:
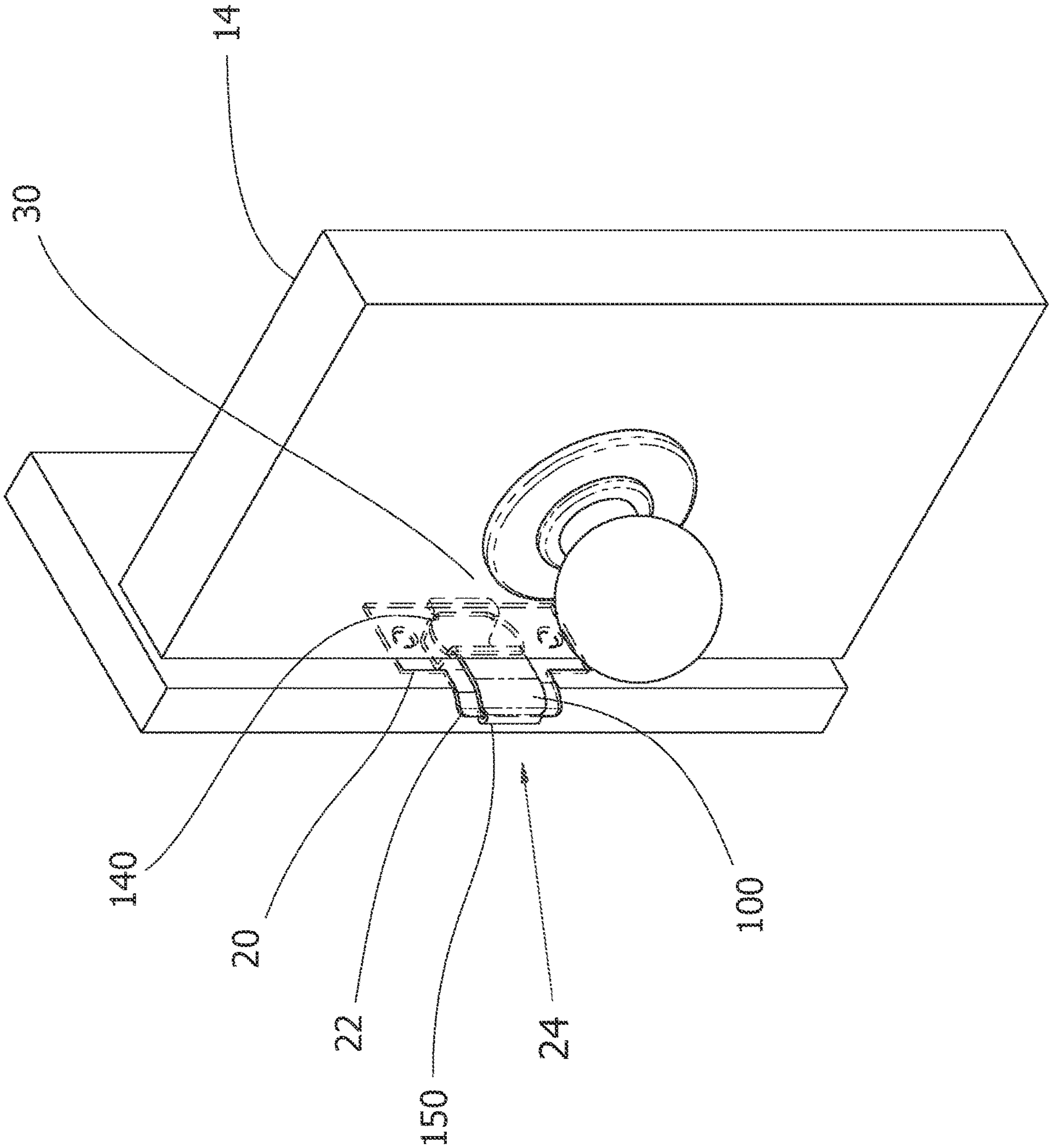
FIG. 5 shows a perspective drawing of noise reduction strike plate covering and strike plate and spring bolt according to embodiments.
Figure 6:
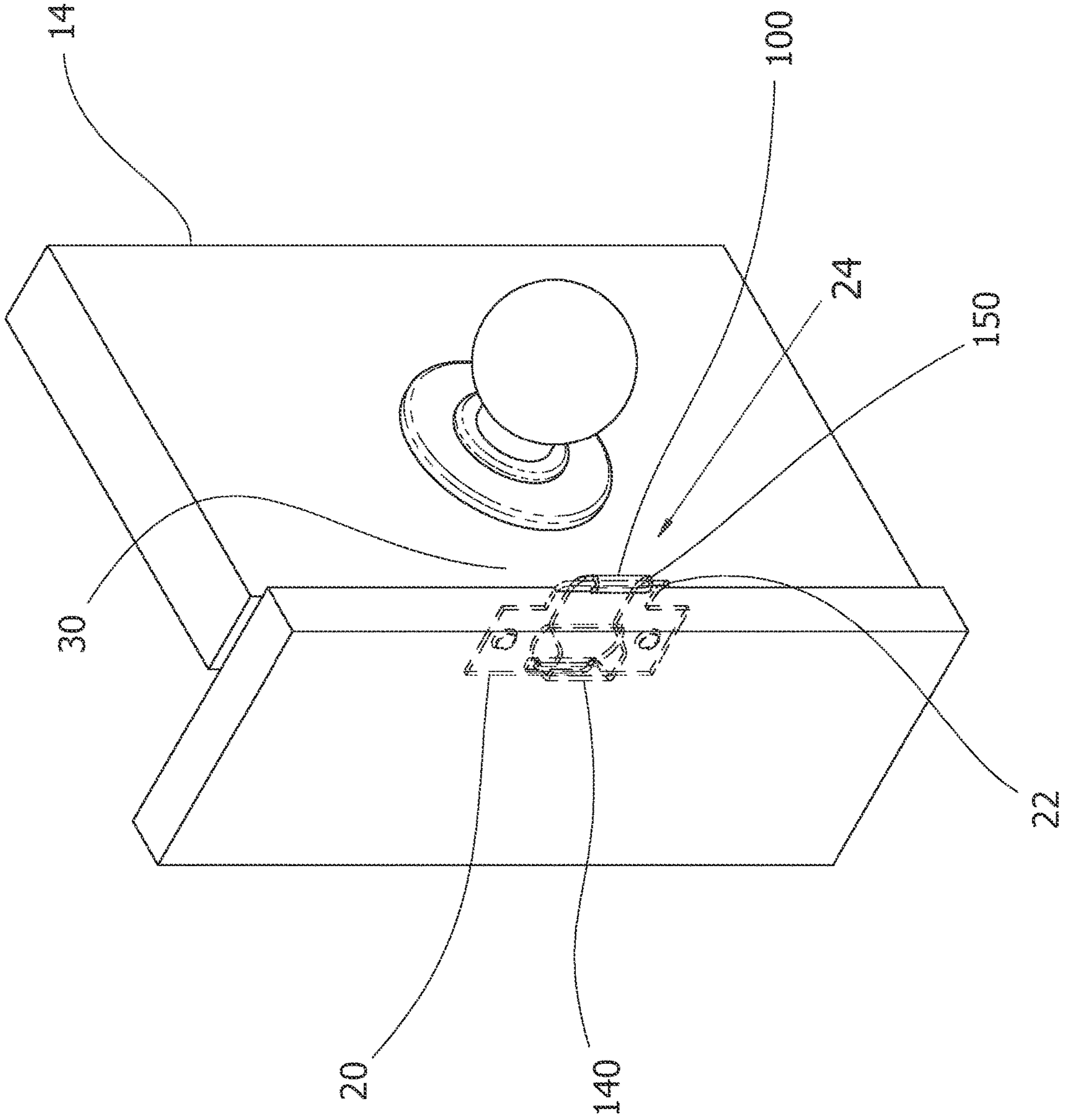
FIG. 6 shows a perspective drawing of noise reduction strike plate covering and strike plate and spring bolt according to embodiments.
Figures 2G, 2H, 7A, 7B, 7C, 7D, 7E, 7F, 7G, 7H:
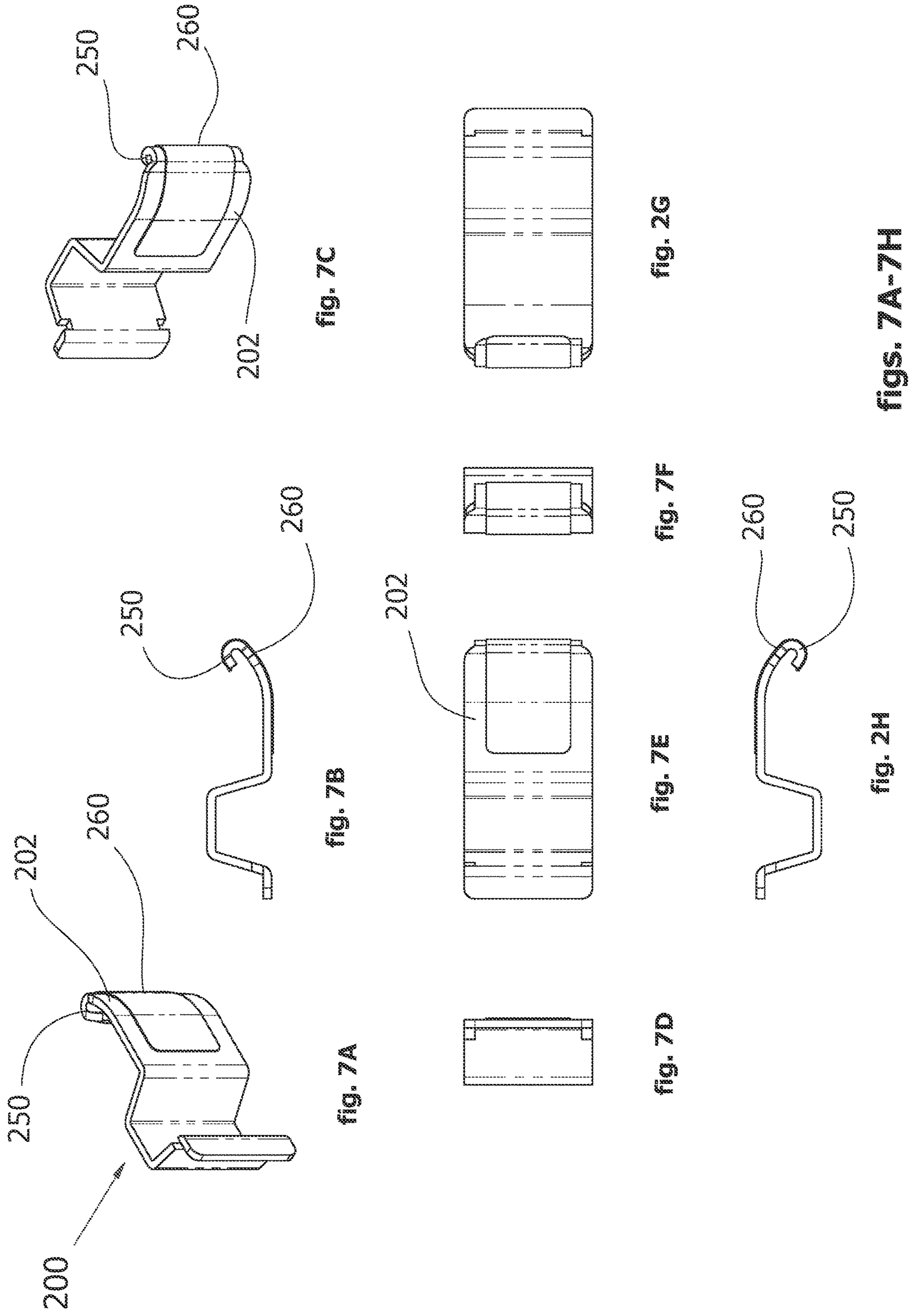
FIGS. 7A-7H show drawings of noise reduction strike plate covering according to embodiments.
Figures 8A, 8B, 8C, 8D, 8E, 8F, 8G, 8H:
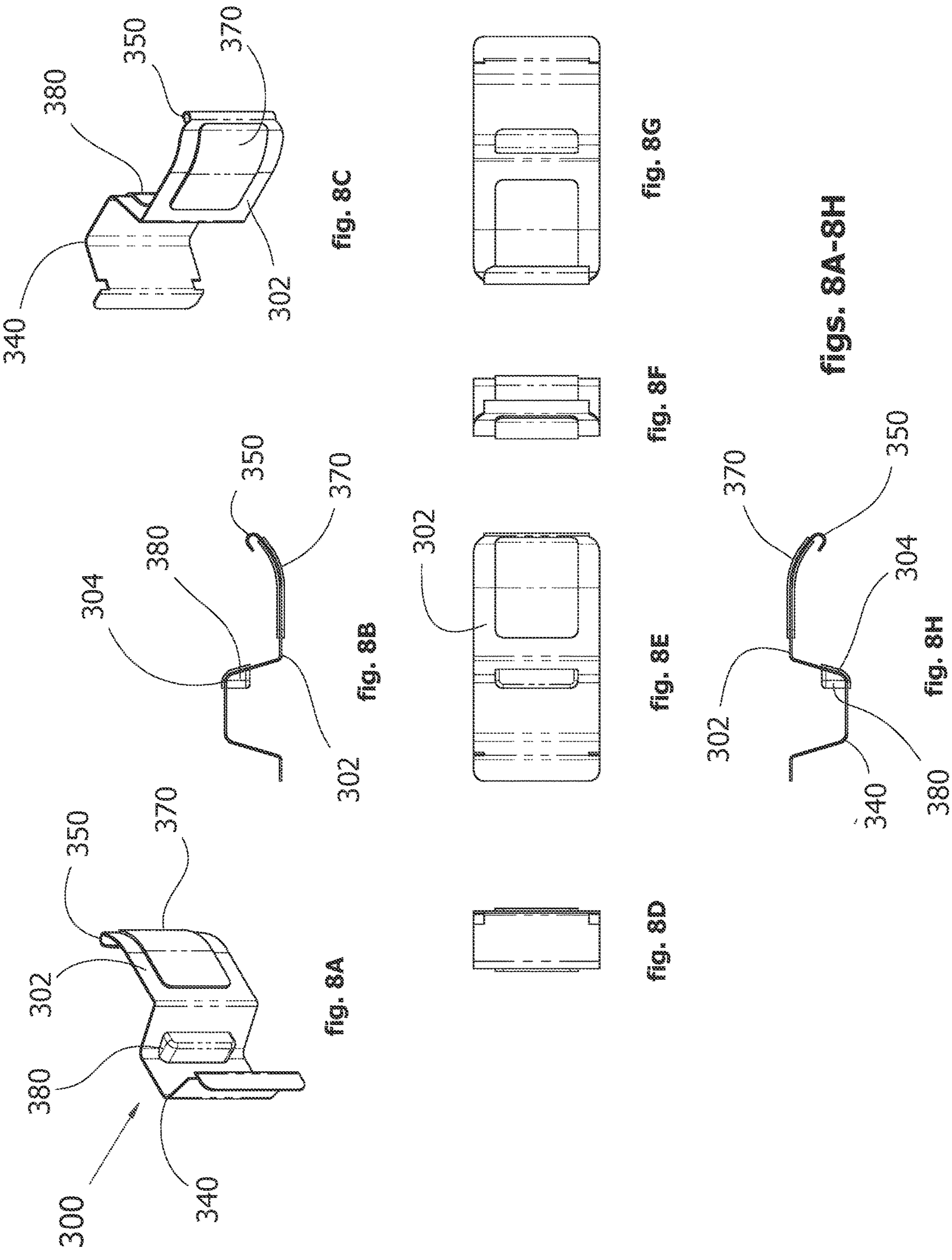
FIGS. 8A-8H show drawings of noise reduction strike plate covering according to embodiments.
Figures 9A, 9B, 9C, 9D, 9E, 9F, 9G, 9H:
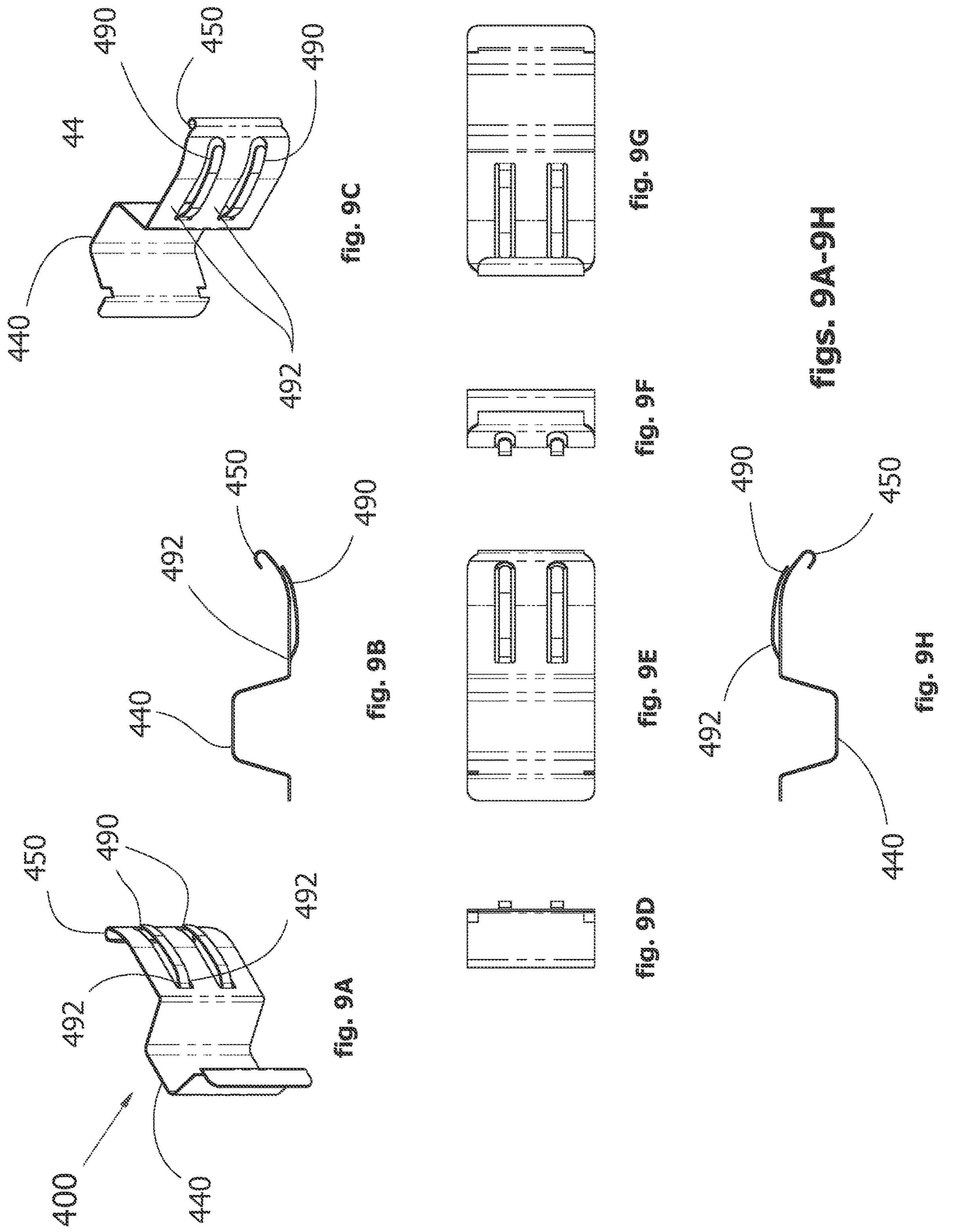
FIGS. 9A-9H show drawings of noise reduction strike plate covering according to embodiments.
Figures 10A, 10B, 10C, 10D, 10E, 10F, 10G, 10H:
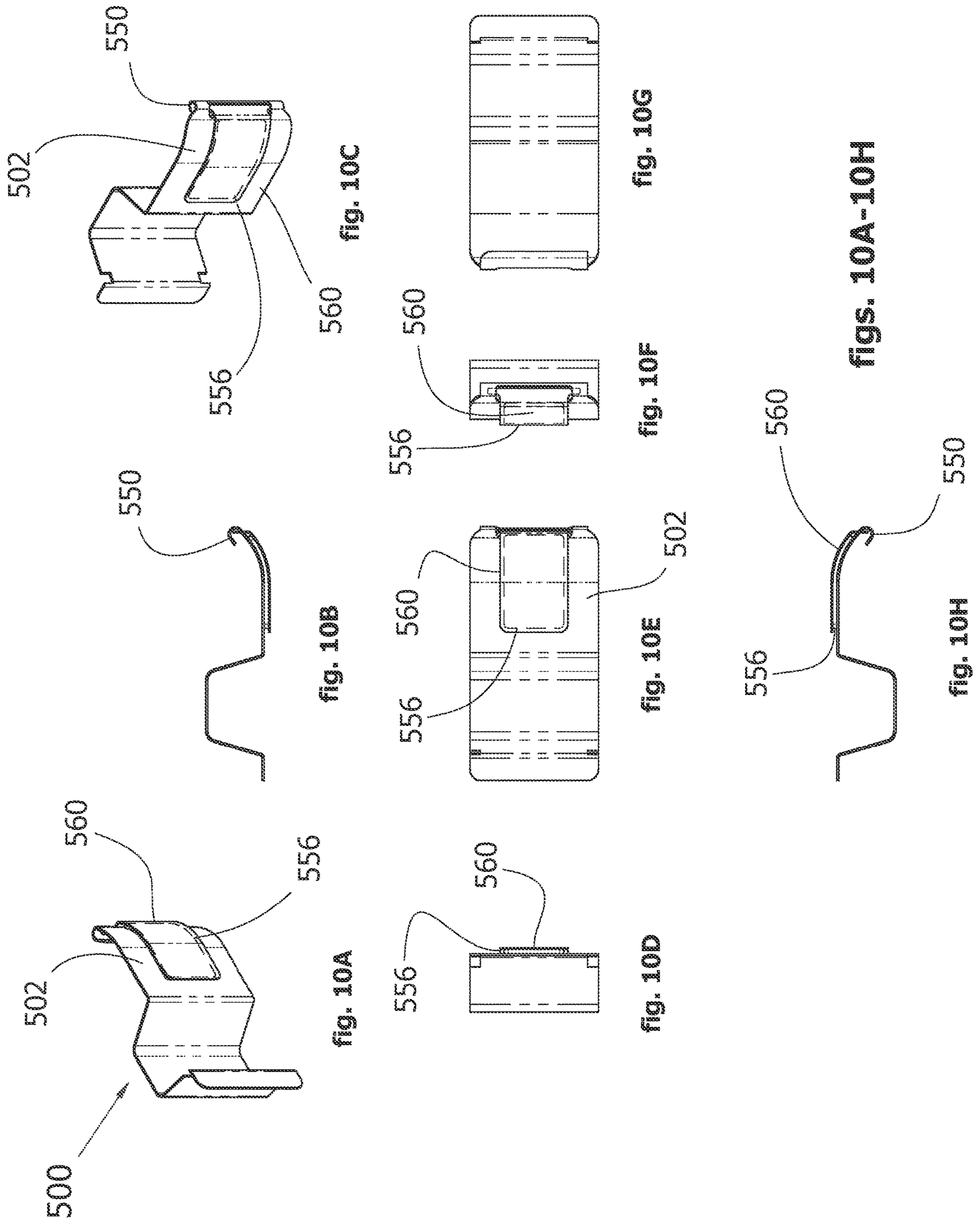
FIGS. 10A-10H show drawings of noise reduction strike plate covering according to embodiments.

FIGS. 3-6 show perspectives of one embodiment of strike plate covering 100 deployed with strike plate 20 and spring bolt 30. FIGS. 3 and 4 show orientation of strike plate covering 100 to strike plate 20 and spring bolt 30. FIGS. 5 and 6 show strike plate covering 100 secured to strike plate 22 with door 14 in closed position and spring bolt 30 released. Strike ramp grip 150 hooks around end of strike ramp 22. Strike plate covering 100 lies flush with strike plate 20. Bolt hole insert 140 fits into bolt hole 26.

FIGS. 7A-7H show perspective views of another embodiment of strike plate covering 200. In this embodiment, strike plate covering 200 includes a first secondary strike pad 260. First secondary strike pad 260 fits over the strike surface 202 of strike plate covering 200 including covering strike ramp grip 250. First secondary strike pad 260 may be made of all materials described for strike plate cover 100. Material of first secondary strike pad 260 may be the same or different from the material of strike plate covering 200. First secondary strike pad 260 may provide additional sound absorption to strike plate covering 200. First secondary strike pad 260 may be permanently or temporarily affixed to strike plate covering 200. Temporary first secondary strike pads 260 may be replaced when worn without discarding strike plate covering 200.

FIGS. 8A-8H show perspective views of another embodiment of strike plate covering 300. In this embodiment, strike plate covering 300 includes a second secondary strike pad 370 and a bolt hole insert strike pad 380. Second secondary strike pad 370 fits over the strike surface 302 of strike plate covering 300 without covering strike ramp grip 350. Bolt hole insert strike pad 380 fits in a bolt hole strike edge 304. As spring bolt 30 releases into bolt hole insert 340 a leading edge of spring bolt 30 strikes the bolt hole strike edge 304. Second secondary strike pad 370 and bolt hole insert strike pad 380 may be made of all materials described for strike plate cover 100. Material of secondary strike pad 370 and bolt hole insert strike pad 380 may be the same or different from the material of strike plate covering 300. Second secondary strike pad 370 and bolt hole insert strike pad 380 may provide additional sound absorption to strike plate covering 300. Second secondary strike pad 370 and bolt hole insert strike pad 380 may be permanently or temporarily affixed to strike plate covering 300. Temporary second secondary strike pads 370 and bolt hole insert strike pads 380 may be replaced when worn without discarding strike plate covering 300.

FIGS. 9A-9H show perspective views of another embodiment of strike plate covering 400. In this embodiment, strike plate covering 400 includes a set of tension strike ramps 490. Tension strike ramps 490 are affixed to a position 492 on the strike surface 402 of strike plate covering 400 proximate to the bolt hole insert 440. The tension strike ramps 490 extend across the strike surface 402 towards the strike ramp grip 450. With the exception of the attachment positions 492, tension strike ramps 490 are not affixed to the strike plate covering 400. Tension strike ramps 490 are shown as a set of two. Tension strike ramps 490 may include a single unitary ramp or a plurality of ramps. Tension strike ramps 490 may provide additional sound absorption to strike plate covering 400.

FIGS. 10A-10H show perspective views of another embodiment of strike plate covering 500. In this embodiment, strike plate covering 500 includes a third secondary strike pad 560. Third secondary strike pad 560 fits over the strike surface 502 of strike plate covering 500 including covering strike ramp grip 550 and attaching to a strike ramp leading edge 552. With the exception of the attachment position 554, third secondary strike pad 560 is not affixed to the strike plate covering 500. Third secondary strike pad 560 may be made of all materials described for strike plate cover 100. Material of third secondary strike pad 560 may be the same or different from the material of strike plate covering 500. Third secondary strike pad 560 may provide additional sound absorption to strike plate covering 500. A sound absorption material 556 may be inserted between the third secondary strike pad 560 and the strike surface 502. Sound absorption material 556 may be softer than third secondary strike pad 560. Sound absorption material 556 may include a gel or other super soft material. Sound absorption material 556 may be made of all materials described for strike plate cover 100. Material of sound absorption material 556 may be the same or different from the material of strike plate covering 500. Sound absorption material 556 may provide additional sound absorption to strike plate covering 500.

Figure 11:
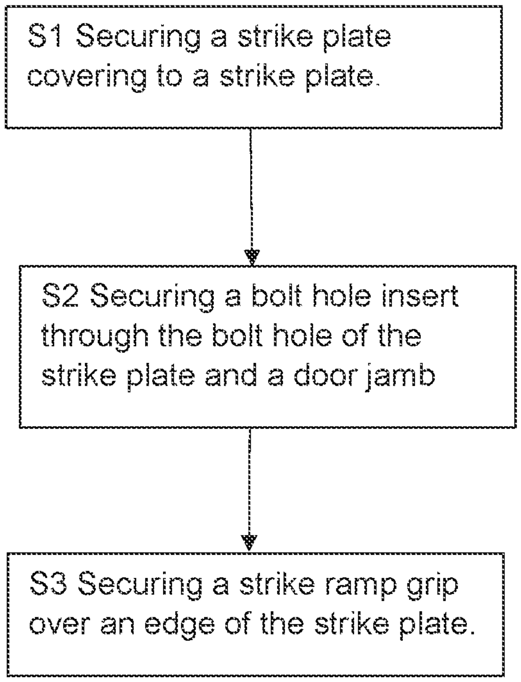
FIG. 11 shows a flow diagram for a method of installing noise reduction strike plate covering system according to embodiments.

FIG. 11 shows a flow diagram for one embodiment of a method of deploying a noise reduction strike plate covering 100, 200, 300, 400, and 500. The method includes placing any of the embodiments of the noise reduction strike plate covering 100, 200, 300, 400, and 500 as described herein over a strike plate without the use of adhesives or hardware.

FIGS. 5 and 6 show one embodiment of a noise reduction strike plate covering system including a strike plate 20; and any of the embodiments of the noise reduction strike plate covering 100, 200, 300, 400 as described herein over the strike plate 22 without the use of adhesives or hardware.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A noise reduction strike plate covering, comprising:

a sheet of noise dampening material adaptively shaped to cover a strike plate in a door frame;

wherein a portion of the sheet includes a bolt hole insert adaptively shaped to be received by a bolt hole through the strike plate;

wherein a portion of the sheet includes a strike ramp grip adaptively shaped to grip an end of a strike bolt ramp of the strike plate;

a secondary strike pad, wherein the secondary strike pad fits over a strike surface of the strike plate covering; and a bolt hole insert strike pad, wherein the bolt hole insert strike pad fits in a bolt hole strike edge.

2. The noise reduction strike plate covering of claim 1, wherein the bolt hole insert is shaped as a trapezoid.

3. The noise reduction strike plate covering of claim 1, wherein the strike ramp grip is shaped as a hooked lip.

4. The noise reduction strike plate covering of claim 1, wherein the noise dampening material is a 3D-printed flexible resin.

5. The noise reduction strike plate covering of claim 1, wherein the noise dampening material is a sheet magnet.

6. The noise reduction strike plate covering of claim 1, wherein the noise dampening material is a rubber or silicone.

7. The noise reduction strike plate covering of claim 1, wherein the sheet from a top view is shaped as a rectangle.

8. The noise reduction strike plate covering of claim 7, wherein the sheet is approximately (2.0) two inches in length by (0.9) nine tenths inches in width and by (0.1) one tenth inches in depth.

9. The noise reduction strike plate covering of claim 1, wherein the sheet from a side view is substantially planar with a trapezoidal projection forming the bolt hole insert.

10. The noise reduction strike plate covering of claim 1, further comprising:

a tension strike ramp, wherein an end of the tension strike ramp affixes to a strike surface proximal to the bolt hole insert, and wherein the tension strike ramp extends over the strike surface towards the strike ramp grip.

11. A noise reduction strike plate covering system, the system comprising:

a strike plate;

the noise reduction strike plate covering of claim 1 over the strike plate without the use of adhesives or hardware;

securing the bolt hole insert in the bolt hole of the strike plate; and securing the strike ramp grip over the end of the strike ramp of the strike plate.

12. A noise reduction strike plate covering, comprising:

a sheet of noise dampening material adaptively shaped to cover a strike plate in a door frame;

wherein a portion of the sheet includes a bolt hole insert adaptively shaped to be received by a bolt hole through the strike plate;

wherein a portion of the sheet includes a strike ramp grip adaptively shaped to grip an end of a strike bolt ramp of the strike plate;

a plurality of tension strike ramps, wherein an end of each tension strike ramp affixes to the strike surface proximal to the bolt hole insert, and wherein each tension strike ramp extends over a strike surface towards the strike ramp grip.

13. The noise reduction strike plate covering of claim 12, further comprising:

a secondary strike pad wherein the secondary strike pad fits over a strike surface of the strike plate covering including covering strike ramp grip.

14. The noise reduction strike plate covering of claim 12, further comprising:

a secondary strike pad wherein the secondary strike pad fits over a strike surface of the strike plate covering including covering strike ramp grip and attaching to a strike ramp leading edge.

15. A noise reduction strike plate covering system, the system comprising:

a strike plate;

the noise reduction strike plate covering of claim 12 over the strike plate without the use of adhesives or hardware;

securing the bolt hole insert in the bolt hole of the strike plate; and securing the strike ramp grip over the end of the strike ramp of the strike plate.

* * * * *